United States Patent
Baba

(10) Patent No.: US 11,568,336 B2
(45) Date of Patent: Jan. 31, 2023

(54) INFORMATION-TECHNOLOGY-UTILIZATION EVALUATION DEVICE, INFORMATION-TECHNOLOGY-UTILIZATION EVALUATION SYSTEM, AND INFORMATION-TECHNOLOGY-UTILIZATION EVALUATION METHOD

(71) Applicant: Mitsubishi Electric Corporation, Tokyo (JP)

(72) Inventor: Takenori Baba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/298,946

(22) PCT Filed: Feb. 6, 2019

(86) PCT No.: PCT/JP2019/004287
§ 371 (c)(1),
(2) Date: Jun. 2, 2021

(87) PCT Pub. No.: WO2020/161841
PCT Pub. Date: Aug. 13, 2020

(65) Prior Publication Data
US 2021/0357829 A1 Nov. 18, 2021

(51) Int. Cl.
*G06Q 10/00* (2012.01)
*G06Q 10/06* (2012.01)

(52) U.S. Cl.
CPC . *G06Q 10/06311* (2013.01); *G06Q 10/06375* (2013.01); *G06Q 10/0639* (2013.01)

(58) Field of Classification Search
CPC combination set(s) only.
See application file for complete search history.

(56) References Cited

U.S. PATENT DOCUMENTS

| 10,031,646 B2 | 7/2018 | Pearcy et al. |
| 10,664,771 B2 | 5/2020 | Chan et al. |

(Continued)

FOREIGN PATENT DOCUMENTS

| JP | 10-8719 A | 1/1998 |
| JP | 2004-127108 A | 4/2004 |

(Continued)

OTHER PUBLICATIONS

Williams, P. A., Lovelock, B., Cabarrus, T., & Harvey, M. (Jan. 11, 2019). Improving digital hospital transformation: development of an outcomes-based infrastructure maturity assessment framework. JMIR medical informatics, 7(1), e12465. (Year: 2019).*

(Continued)

*Primary Examiner* — Hafiz A Kassim
*Assistant Examiner* — Matheus Ribeiro Stivaletti
(74) *Attorney, Agent, or Firm* — Xsensus LLP

(57) ABSTRACT

An information-technology-utilization evaluation device evaluates the degree of utilization of information technology in process management targeted at a managed process that is a set of unit processes. The information-technology-utilization evaluation device includes a first determination unit to evaluate an achievement status of automation of the process management through utilization of the information technology to determine a maturity level of the automation in the managed process and a maturity level of the automation in the unit processes.

10 Claims, 8 Drawing Sheets

(56) References Cited

U.S. PATENT DOCUMENTS

| | | | |
|---|---|---|---|
| 2005/0040223 A1* | 2/2005 | Yigit | G06Q 10/105 |
| | | | 705/320 |
| 2008/0235079 A1* | 9/2008 | Barel | G06Q 30/0201 |
| | | | 705/7.32 |
| 2009/0217194 A1 | 8/2009 | Martin et al. | |
| 2015/0220266 A1* | 8/2015 | Morimoto | G06F 3/0486 |
| | | | 345/87 |
| 2020/0050989 A1 | 2/2020 | Nakagami et al. | |

FOREIGN PATENT DOCUMENTS

| | | | | |
|---|---|---|---|---|
| JP | 2009-199598 A | 9/2009 | | |
| JP | 2012-123445 A | 6/2012 | | |
| JP | 2014-531652 A | 11/2014 | | |
| JP | 2018-109957 A | 7/2018 | | |
| WO | WO2001008037 A2 * | 2/2001 | | G06Q 10/10 |
| WO | 2018/158941 A1 | 9/2018 | | |

OTHER PUBLICATIONS

International Search Report and Written Opinion dated May 7, 2019, received for PCT Application PCT/JP2019/004287, Filed on Feb. 6, 2019, 9 pages including English Translation.

Notice of Reason for Refusal dated Nov. 19, 2019, received for JP Application 2019-553127, 8 pages including English Translation.

Decision to Grant dated Jan. 21, 2020, received for JP Application 2019-553127, 5 pages including English Translation.

Office Action dated May 18, 2022, in corresponding Chinese patent Application No. 201980090959.X, 13 pages.

* cited by examiner

FIG.3

| AUTOMA-TION / SCALE | LEVEL 1 (FACILITY) | LEVEL 2 (WORKSHOP) | LEVEL 3 (FACTORY) | LEVEL 4 (SUPPLY CHAIN) |
|---|---|---|---|---|
| LEVEL a (DATA COLLECTION) | | | | |
| LEVEL b (VISUALIZING) | | | | |
| LEVEL c (ANALYSIS) | | | | |
| LEVEL d (IMPROVEMENT) | | | | |

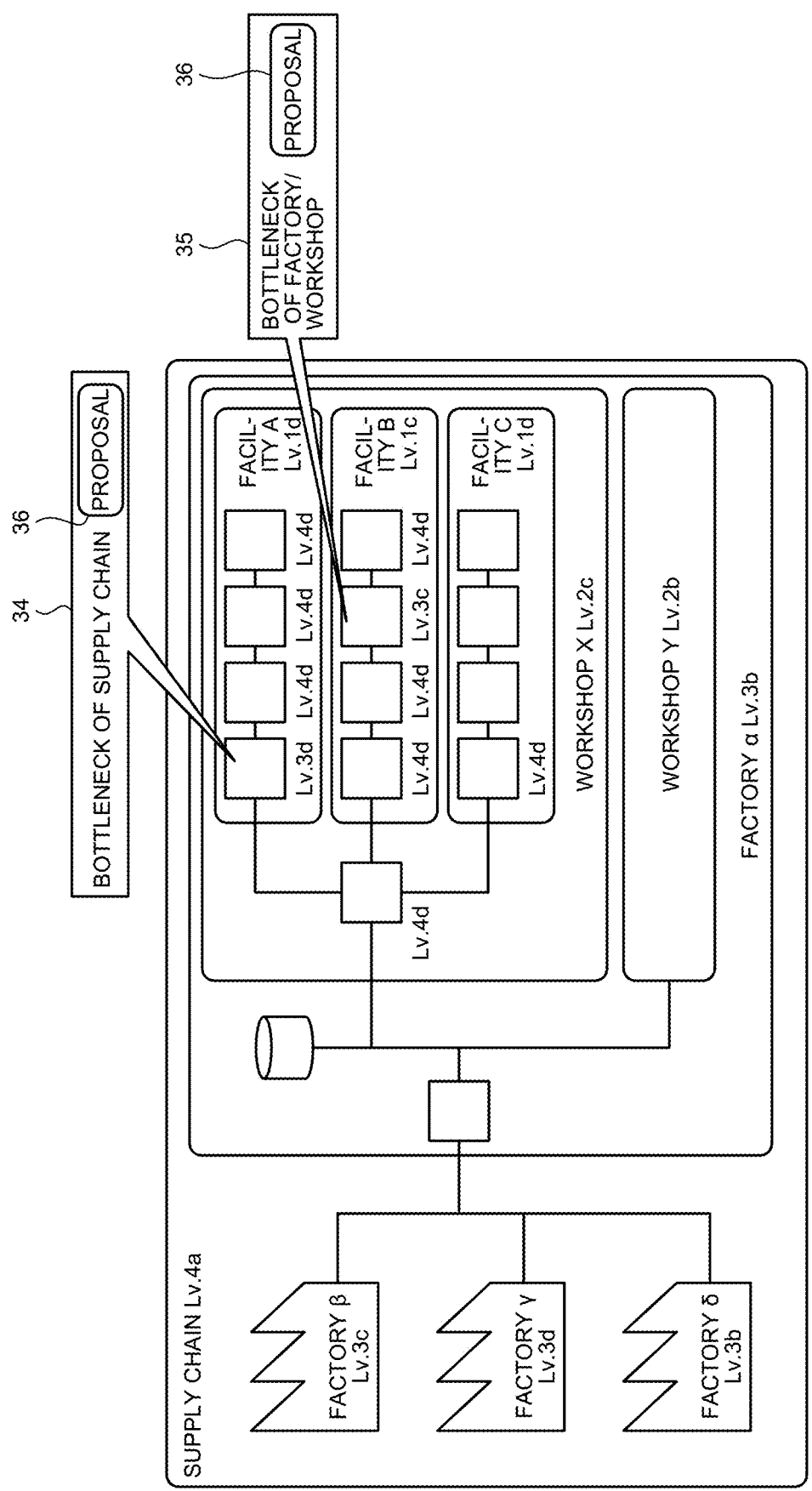

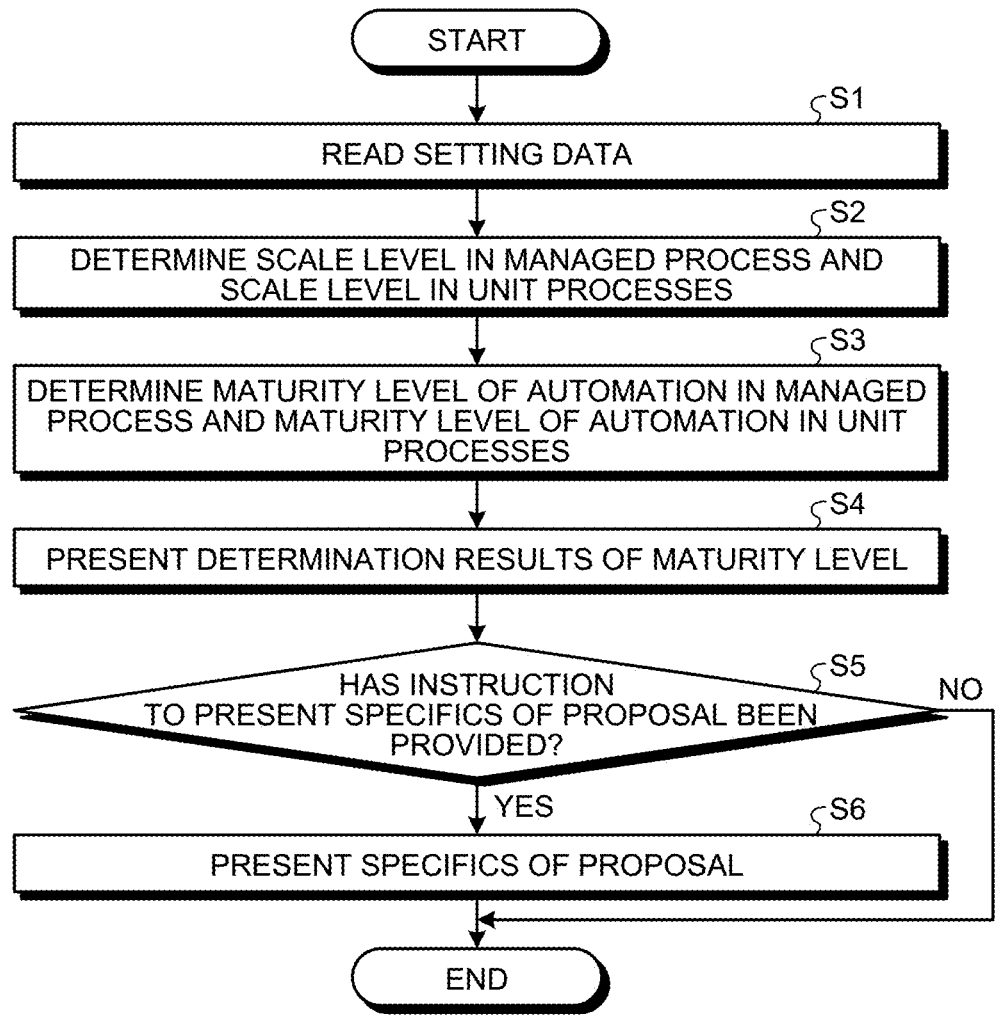
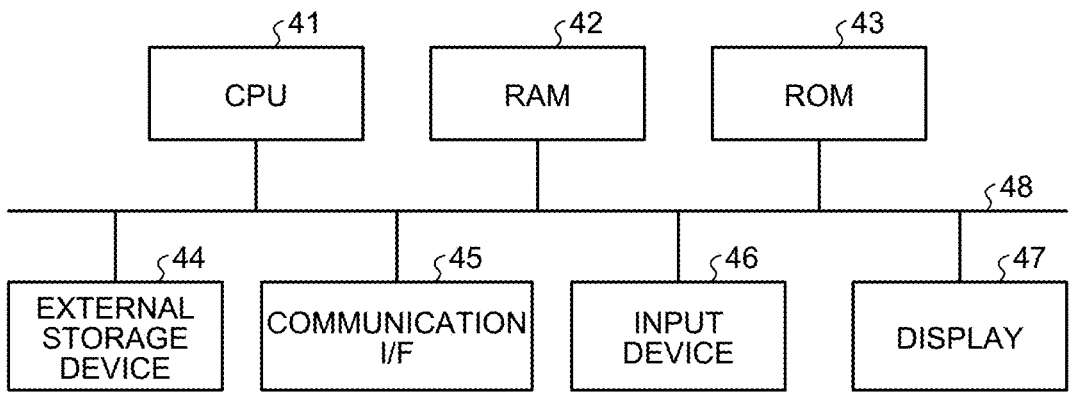

INFORMATION-TECHNOLOGY-UTILIZATION EVALUATION DEVICE, INFORMATION-TECHNOLOGY-UTILIZATION EVALUATION SYSTEM, AND INFORMATION-TECHNOLOGY-UTILIZATION EVALUATION METHOD

CROSS-REFERENCE TO RELATED APPLICATION

The present application is based on PCT filing PCT/JP2019/004287, filed Feb. 6, 2019, the entire contents of which are incorporated herein by reference.

FIELD

The present invention relates to an information-technology-utilization evaluation device, an information-technology-utilization evaluation system, and an information-technology-utilization evaluation method to evaluate the degree of utilization of information technology in management of a managed process.

BACKGROUND

In order to improve productivity in a production system, process management through Information Technology (IT) utilization is conducted in some cases. Through IT utilization, information is collected from a production site, and the collected information is analyzed and diagnosed. Use of the analysis results and diagnostic results makes it possible to efficiently improve the productivity.

Patent Literature 1 discloses an IT-utilization evaluation device that evaluates the degree of IT utilization in a managed process of a production system by determining the progress of automation through IT utilization and the scale of a set of unit processes in which IT is utilized.

CITATION LIST

Patent Literature

Patent Literature 1: International Publication No. WO2018/158941

SUMMARY

Technical Problem

In order to prevent an oversight in an evaluation of IT utilization in a managed process, it is useful to know the details on the evaluation in the managed process, that is, to know the achievement status of automation in each constituent element of the managed process, aside from the evaluation of IT utilization in the managed process in its entirety. At the time of planning IT introduction into the production system, it is useful to know the details on an evaluation of IT utilization in order to effectively promote the IT utilization. While the IT-utilization evaluation device in Patent Literature 1 described above evaluates IT utilization in the managed process in its entirety, there is a problem with this IT-utilization evaluation device that a user cannot know the details on the evaluation in the managed process.

The present invention has been achieved to solve the above problems, and an object of the present invention is to provide an information-technology-utilization evaluation device that can obtain details on an evaluation of IT utilization in a managed process.

Solution to Problem

In order to solve the above problems and achieve the object, an information-technology-utilization evaluation device according to the present invention is an information-technology-utilization evaluation device to evaluate a degree of utilization of information technology in process management targeted at a managed process that is a set of unit processes, the device including a first determination unit to evaluate an achievement status of automation of the process management through utilization of the information technology to determine a maturity level of the automation in the managed process and a maturity level of the automation in the unit processes.

Advantageous Effects of Invention

The information-technology-utilization evaluation device according to the present invention has an effect where it is possible to obtain details on an evaluation of IT utilization in a managed process.

BRIEF DESCRIPTION OF DRAWINGS

FIG. 3 is an explanatory diagram illustrating a maturity level of automation and a scale level that are determined by the IT-utilization evaluation device according to the first embodiment.

FIG. 6 is a third explanatory diagram illustrating presentation of a maturity level by the presentation unit included in the IT-utilization evaluation device according to the first embodiment.

FIG. 7 is a flowchart illustrating an operational procedure for the IT-utilization evaluation device according to the first embodiment.

FIG. 8 is a block diagram illustrating a hardware configuration of the IT-utilization evaluation device according to the first embodiment.

DESCRIPTION OF EMBODIMENTS

An information-technology-utilization evaluation device, an information-technology-utilization evaluation system, and an information-technology-utilization evaluation method according to embodiments of the present invention will be described in detail below with reference to the accompanying drawings. The present invention is not limited to the embodiments.

First Embodiment

An information-technology-utilization evaluation device according to a first embodiment of the present invention evaluates the degree of IT utilization in process management of a managed process that is a set of unit processes. In the following descriptions, the information-technology-utilization evaluation device is referred to as "IT-utilization evaluation device". An example of the managed process that is a target to be evaluated by the IT-utilization evaluation device is a supply chain including manufacturing processes in the manufacturing industry. In the supply chain, process management to improve the productivity is conducted. The IT-utilization evaluation device according to the first embodiment evaluates the degree of IT utilization in process management in the supply chain in its entirety. The IT-utilization evaluation device according to the first embodiment determines the maturity level of automation in each constituent element of the supply chain. The maturity level of automation in each constituent element represents the details on an evaluation in the supply chain.

Figure 1:
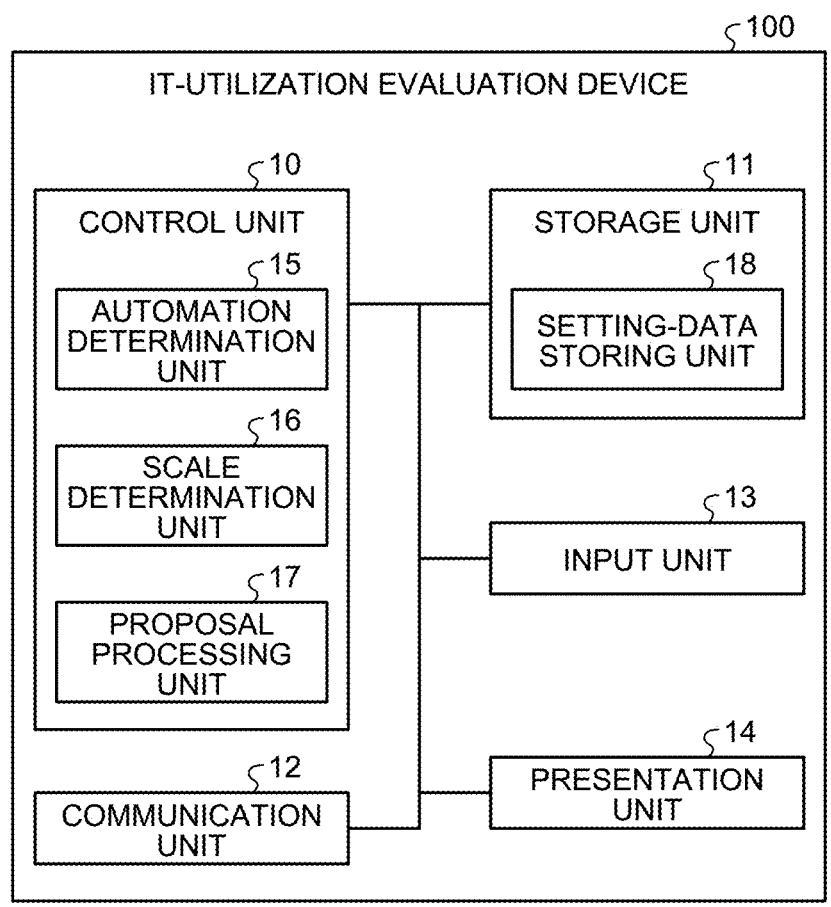
FIG. 1 is a block diagram illustrating a functional configuration of an IT-utilization evaluation device according to a first embodiment of the present invention.

FIG. 1 is a block diagram illustrating a functional configuration of an IT-utilization evaluation device 100 according to the first embodiment of the present invention. The IT-utilization evaluation device 100 is a computer or a controller having a program installed therein. The program is designed to evaluate the degree of IT utilization. Each functional unit illustrated in FIG. 1 is implemented by executing the program. In the following descriptions, the program designed to evaluate the degree of IT utilization is sometimes referred to as "IT-utilization evaluation program".

The IT-utilization evaluation device 100 includes a control unit 10 to control the IT-utilization evaluation device 100, a storage unit 11 to store information therein, a communication unit 12 to communicate with devices outside the IT-utilization evaluation device 100, an input unit 13 through which information is input to the IT-utilization evaluation device 100, and a presentation unit 14 to present information.

The control unit 10 includes an automation determination unit 15 that is a first determination unit, and a scale determination unit 16 that is a second determination unit. The automation determination unit 15 evaluates the achievement status of automation of process management through IT utilization to determine the maturity level of the automation in a managed process and the maturity level of the automation in unit processes. The unit processes constitute the managed process, and are constituent elements of the managed process. The maturity level represents the stage of the automation which has been achieved among the stages of the process management ranging from identifying the work status in the managed process to improving the productivity in the managed process. The scale determination unit 16 determines the scale level indicating the scale of a set of unit processes. The control unit 10 includes a proposal processing unit 17 to perform processing for a proposal for promotion of IT utilization. The proposal processing unit 17 determines specifics of a proposal for promotion of IT utilization in view of the current status on the basis of a determination result of the maturity level. The automation determination unit 15, the scale determination unit 16, and the proposal processing unit 17 are responsible for data analysis in the IT-utilization evaluation device 100.

The storage unit 11 includes a setting-data storing unit 18 to store setting data therein. The setting data is described later. The presentation unit 14 presents a determination result of the maturity level in a managed process, and a determination result of the maturity level in unit processes.

Figure 2:
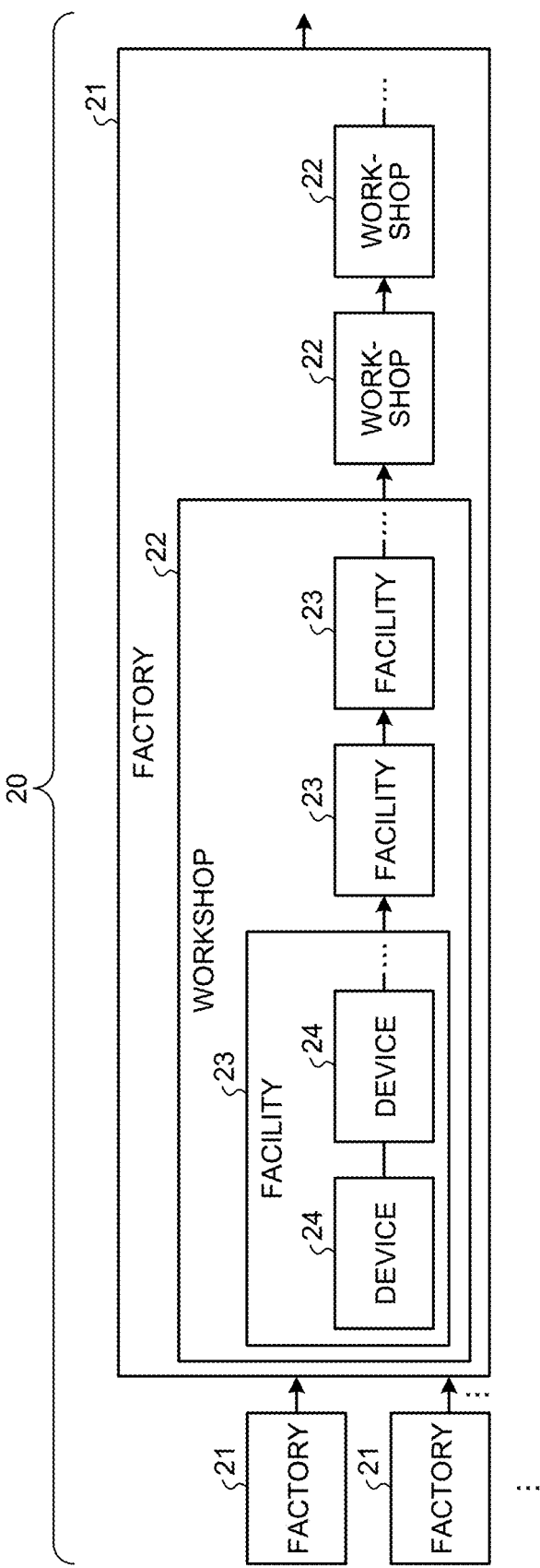
FIG. 2 is a diagram illustrating an example of a supply chain that is a target to be evaluated by the IT-utilization evaluation device according to the first embodiment.

Next, descriptions are given of a supply chain that is a target to be evaluated by the IT-utilization evaluation device 100 according to the first embodiment. FIG. 2 is a diagram illustrating an example of a supply chain 20 that is a target to be evaluated by the IT-utilization evaluation device 100 according to the first embodiment. In the first embodiment, the supply chain 20 is a chain of work processes including purchase of materials and parts, production, inventory management, sales, and distribution. FIG. 2 illustrates the state of the chain of work processes.

A factory 21 is a production site. The supply chain 20 includes processes in a plurality of factories 21. The factories 21 include the factory 21 to produce parts, and the factory 21 to assemble the produced parts and ship products. In the following descriptions, the factory 21 may sometimes indicate the process in the factory 21 when simply referred to as "factory 21".

The supply chain 20 can be regarded as a set of the factories 21. The factories 21 can be regarded as constituent elements of the supply chain 20. The supply chain 20 can include any number of factories 21.

A workshop 22 is the site responsible for an assigned part of the production process in the factory 21. The process in the factory 21 includes processes in a plurality of workshops 22. The workshops 22 include the workshop 22 responsible for performing given machining on workpieces, the workshop 22 responsible for assembling the machined workpieces, and the workshop 22 responsible for inspecting the assembled products. In the following descriptions, the workshop 22 may sometimes indicate the process in the workshop 22 when simply referred to as "workshop 22".

The factory 21 can be regarded as a set of the workshops 22. The workshops 22 can be regarded as constituent elements of the factory 21. It is assumed that there are any number of workshops 22 in the factory 21. It is assumed that there are any number of workshops 22 in each individual factory 21 illustrated in FIG. 2. It is allowable that each individual workshop 22 may include a plurality of work lines on which the work common to the lines is performed.

A facility 23 is a device responsible for an assigned part of the work in the workshop 22. The process in the workshop 22 includes respective processes in a plurality of facilities 23. The facilities 23 in the workshop 22 responsible for performing given machining on workpieces are various types of machine tools to machine workpieces, and a robot to hold and move each of the workpieces. In the following descriptions, the facility 23 may sometimes indicate the process in the facility 23 when simply referred to as "facility 23". It is assumed that there are any number of facilities 23 in the workshop 22. It is assumed that there are any number of facilities 23 in each individual workshop 22 within each individual factory 21 illustrated in FIG. 2.

The process in the workshop 22 may include a process of manual work to be done by workers in addition to the processes in the facilities 23. The process in the workshop 22 can be regarded as a set of the processes in the facilities 23 and processes to be done by workers. As described above, work in each process includes work to be done by operation of the facility 23 in accordance with an instruction or a schedule, and manual work to be done by workers.

Devices 24 are constituent elements of the facility 23. The devices 24 within the facility 23 have their particular functions for operation of the facility 23. Each of the devices 24 is an element responsible for its assigned function for operation of the facility 23. Examples of the devices 24 in the facility 23 that is a machine tool include a controller that controls the machine tool, various types of motors that are driven under control of the controller, and various types of sensors that detect the operating status of the machine tool. The facility 23 can be regarded as a set of the devices 24. The devices 24 can be regarded as constituent elements of the facility 23. As described above, the process in the facility 23 is broken down into sub-processes for the devices 24. In a process to be done by workers, the device 24 that records workers' actual work performance, or the device 24 that assists workers in making a determination or performing work may be used in some cases. Even in a case where work involved in production is manual work, when IT can be introduced into a process of the work for process management, then this process is still included in the target for an evaluation of IT utilization.

In each factory 21, a computer is provided in which data to be used for process management is aggregated. The IT-utilization evaluation device 100 is connected to the computer in each factory 21 to be capable of communicating with the computer. The IT-utilization evaluation device 100 evaluates IT utilization in the supply chain 20 in its entirety on the basis of information transmitted from the computer in each factory 21. The IT-utilization evaluation device 100 is installed in one of the factories 21. It is allowable that the IT-utilization evaluation device 100 is installed at a location other than the factories 21. In the first embodiment, a user refers to a person who uses the IT-utilization evaluation device 100.

Next, descriptions are given of the maturity level of automation and the scale level that are determined by the IT-utilization evaluation device 100. FIG. 3 is an explanatory diagram illustrating a maturity level of automation and a scale level that are determined by the IT-utilization evaluation device 100 according to the first embodiment.

In the supply chain 20, the condition of the facility 23, the actual operational performance of the facility 23, or workers' actual work performance is identified to determine whether there is a gap between planned production and actual production and take corrective action to the gap in some cases. Also, in some cases, work details may undergo improvements in order to improve the product quality, increase the productivity, and increase the ability to meet the scheduled product delivery times. In order to efficiently produce successful results, it is effective to promote automation in process management, ranging from collecting information to identify the actual operational performance and the actual work performance to improving the work details, through IT utilization. Therefore, the IT-utilization evaluation device 100 defines the maturity level of automation in the process management as a first evaluation element.

In process management for improving the work status in a managed process, activities are carried out in stages, such as identifying the work status in a process included in the managed process, visualizing and analyzing the work status, diagnosing the work status on the basis of analysis results, and improving the productivity on the basis of diagnostic results. The maturity level represents the stage of the automation which has been achieved among the stages of the process management ranging from identifying the work status in the managed process to improving the productivity in the managed process.

In the supply chain 20, it is often difficult to introduce IT simultaneously into all the processes included in the supply chain 20. In general, in the supply chain 20, IT is introduced into each of the processes gradually in stages. It is effective to extend IT utilization in process management not only to the manufacturing process in the factory 21, but also to purchase and storage of materials and parts as well as to product storage, delivery, and sales. Expansion of the scale of IT utilization makes it possible to efficiently achieve greater effects on the inventory plan intended to optimize the production plan on the basis of a sales forecast, to optimize the delivery plan for incoming materials and parts, and to minimize the inventory balance. Therefore, the IT-utilization evaluation device 100 defines the scale of a set of processes, into which IT for process management has been introduced, as a second evaluation element.

The process in the supply chain 20 is a set of the processes in the factories 21 within the supply chain 20. The process in the factory 21 is a set of the processes in the workshops 22 within the factory 21. The process in the workshop 22 is a set of the processes in the facilities 23 within the workshop 22. In a case where the process in the supply chain 20 is a managed process, the processes in the factory 21, the workshop 22, and the facility 23 are included in the managed process. The process in the factory 21, the process in the workshop 22, and the process in the facility 23 are unit processes at different stages from each other. In a case where the process in the factory 21 is a managed process, the process in the workshop 22 and the process in the facility 23 are included in the managed process. The process in the workshop 22 and the process in the facility 23 are unit processes at different stages from each other. As described above, the managed process may include a plurality of unit processes at different stages from each other. The inclusion relation between the managed process and the unit processes as described above forms a hierarchical structure. The scale of the set represents the hierarchy in the hierarchical structure.

In a matrix illustrated in FIG. 3, the vertical axis represents the maturity level of automation. The horizontal axis of the matrix represents the scale level that is the level of the scale of the set. In the IT-utilization evaluation device 100, four levels, "level a", "level b", "level c", and "level d", are defined as the maturity level of automation. The "level a" is lowest of the four levels. The "level a" is defined as a level at which data to be used in process management can be automatically collected and accumulated. The "level b" is one level higher than the "level a". The "level b" is defined as a level at which data can be automatically visualized to display the data automatically collected and accumulated.

The "level c" is one level higher than the "level b". The "level c" is defined as a level at which data can be automatically analyzed and then diagnosed on the basis of the analysis in addition to automatically visualizing the data. The "level d" is one level higher than the "level c", and is highest of the four levels. The "level d" is defined as a level at which remedial action to improve the productivity can be automatically taken in accordance with the diagnostic results. The automation determination unit 15 determines which maturity level of automation has been achieved, "level a", "level b", "level c", or "level d", by evaluating the achievement status of automation.

Basically, the phrase "can be automatically" means that intended operation does not involve manual work. However, it is allowable that the intended operation may partially include manual work. For example, it is allowable that automated work may include workers' manual input. The number of levels to be defined as the maturity level of automation is not limited to four. Any number of levels are defined. The descriptions of the definition of each level are not limited to the above descriptions, but can be appropriately changed. The descriptions of the definition are supposed to be set in advance in the IT-utilization evaluation device 100. It is allowable that the descriptions of the definition are set by a user.

In some cases, the supply chain 20 may include a process that cannot utilize IT for its management. Examples of the process that cannot utilize IT in its management include sensory testing. It is allowable that the IT-utilization evaluation device 100 excludes the process that is not a target for IT introduction, and then determines the maturity level of automation.

In the IT-utilization evaluation device 100, four levels, "level 1", "level 2", "level 3", and "level 4" are defined as the scale level. The "level 1" is lowest of the four levels, and represents the facility 23 described above. The "level 1" also includes the workers described above. The "level 2" is one level higher than the "level 1" and represents the workshop 22 described above.

The "level 3" is one level higher than the "level 2" and represents the factory 21 described above. The "level 4" is one level higher than the "level 3" and is highest of the four levels. The "level 4" represents the supply chain 20 described above. The scale determination unit 16 determines which scale level, "level 1", "level 2", "level 3", or "level 4" a managed process falls into and a unit process falls into. The number of levels to be defined as the scale level is not limited to four, but any number of levels are defined.

In the first embodiment, a Key Performance Indicator (KPI) is used in process management aimed at improving productivity through the supply chain 20. The KPI is a group of indicator values to quantitatively evaluate the degree of achievement of a goal in an organization. Various indicators can be set as the KPI, such as the facility utilization rate, the power consumption amount, and the rate of non-defective products. It is possible for a user to optionally set any indicator to be employed as the KPI.

In a case of process management using the KPI, the "level a", which is one of the maturity levels of automation, indicates that an indicator value can be automatically calculated and the calculated indicator value can be automatically collected. The indicator value is calculated by a publicly-known method. In a case where a constituent element has a sensor that obtains data to be used for calculating the indicator value, a network and an interface to aggregate the obtained data, and other devices, the automation determination unit 15 determines that the constituent element has achieved "level a".

The "level b" indicates that the KPI can be automatically visualized. In a case where a constituent element has a device and software to display the indicator value, the automation determination unit 15 determines that the constituent element has achieved "level b". The "level c" indicates that the indicator value can be automatically analyzed and then diagnosed on the basis of the analysis. When the "level c" is achieved, the past data trends can be analyzed, the future trends can be predicted, whether the improvements can be effective can be determined, and other activities can be performed. In a case where a constituent element has a processing device and software intended for analysis and diagnosis, the automation determination unit 15 determines that the constituent element has achieved "level c". The "level d" indicates that remedial action to improve the productivity can be automatically taken in accordance with the diagnostic results on the basis of the indicator values. Examples of the action include recombination of the systems to improve the productivity. In a case where Artificial Intelligence (AI)-based service is available for use in order to automatically take action on the basis of the diagnostic results, the automation determination unit 15 determines that the "level d" has been achieved.

The IT-utilization evaluation device 100 evaluates the progress status of automation in a managed process in its entirety. The IT-utilization evaluation device 100 evaluates the progress status of automation also in unit processes that constitute the managed process, and that are the details on the evaluation in the managed process.

In a relation between the workshop 22 and the facility 23 within the supply chain 20 illustrated in FIG. 2, the process in the workshop 22 is a managed process with the "level 2". In the relation between the workshop 22 and the facility 23, the process in the facility 23 is a unit process with the "level 1" and is included in the process in the workshop 22. The automation determination unit 15 determines the maturity level of automation in each of the facilities 23 that are constituent elements of the workshop 22, and then determines the maturity level of automation in this workshop 22 on the basis of the determined maturity level of automation in each of the facilities 23.

In a relation between the factory 21 and the workshop 22 within the supply chain 20 illustrated in FIG. 2, the process in the factory 21 is a managed process with the "level 3". In the relation between the factory 21 and the workshop 22, the process in the workshop 22 is a unit process with the "level 2" and is included in the process in the factory 21. On the basis of the maturity level of automation in each of the workshops 22 that are constituent elements of the factory 21, the automation determination unit 15 determines the maturity level of automation in this factory 21. In the relation between the workshop 22 and the facility 23, the process in the workshop 22 is a managed process, while in the relation between the workshop 22 and the factory 21, the process in the workshop 22 is a unit process.

In a relation between the supply chain 20 and the factory 21 illustrated in FIG. 2, the process in the supply chain 20 is a managed process with the "level 4". In the relation between the supply chain 20 and the factory 21, the process in the factory 21 is a unit process with the "level 3", and is included in the supply chain 20. On the basis of the maturity level of automation in each of the factories 21 that are constituent elements of the supply chain 20, the automation determination unit 15 determines the maturity level of automation in the supply chain 20 in its entirety. In the relation between the factory 21 and the workshop 22, the process in the factory 21 is a managed process, while in the relation between the factory 21 and the supply chain 20, the process in the factory 21 is a unit process.

The automation determination unit 15 reads the setting data stored in the setting-data storing unit 18. The automation determination unit 15 determines the maturity level of automation in the facility 23 on the basis of information in the setting data about a connection of the devices 24 that are constituent elements of the facility 23.

In the facility 23, various devices 24 are installed, such as a controller that controls the facility 23 and a sensor that detects the operational status of the facility 23. A setting tool is a program that configures connection settings to establish communication between the devices 24. The setting tool is installed in the controller included in the facility 23. An input/output interface to import a signal from the sensor to the controller is set by the setting tool. A network environment to aggregate data is constructed by the setting tool, so that the facility 23 can achieve automation of data collection. The setting tool is not limited to being installed in the controller included in the facility 23, but may be installed in a device that configures the settings. The device that configures the settings is an external device connected to the controller included in the facility 23.

The setting tool holds therein setting data that shows the actual records of connection settings using the setting tool. In the setting data, a configuration of the network constructed by connecting the devices 24 is recorded. In the setting data, product specifications of each device 24 constituting the network are also recorded. The IT-utilization evaluation device 100 imports the setting data from the setting tool and stores the setting data in the setting-data storing unit 18. On the basis of the setting data, the automation determination unit 15 identifies the status of connection between the devices 24, and identifies the type and the function of each device 24 included in the facility 23.

The presentation unit 14 presents a determination result of the maturity level of automation in a managed process, and a determination result of the maturity level of automation in unit processes. The presentation unit 14 also presents an inclusion relation between the managed process and the unit processes along with the determination results of the maturity level.

Figure 4:
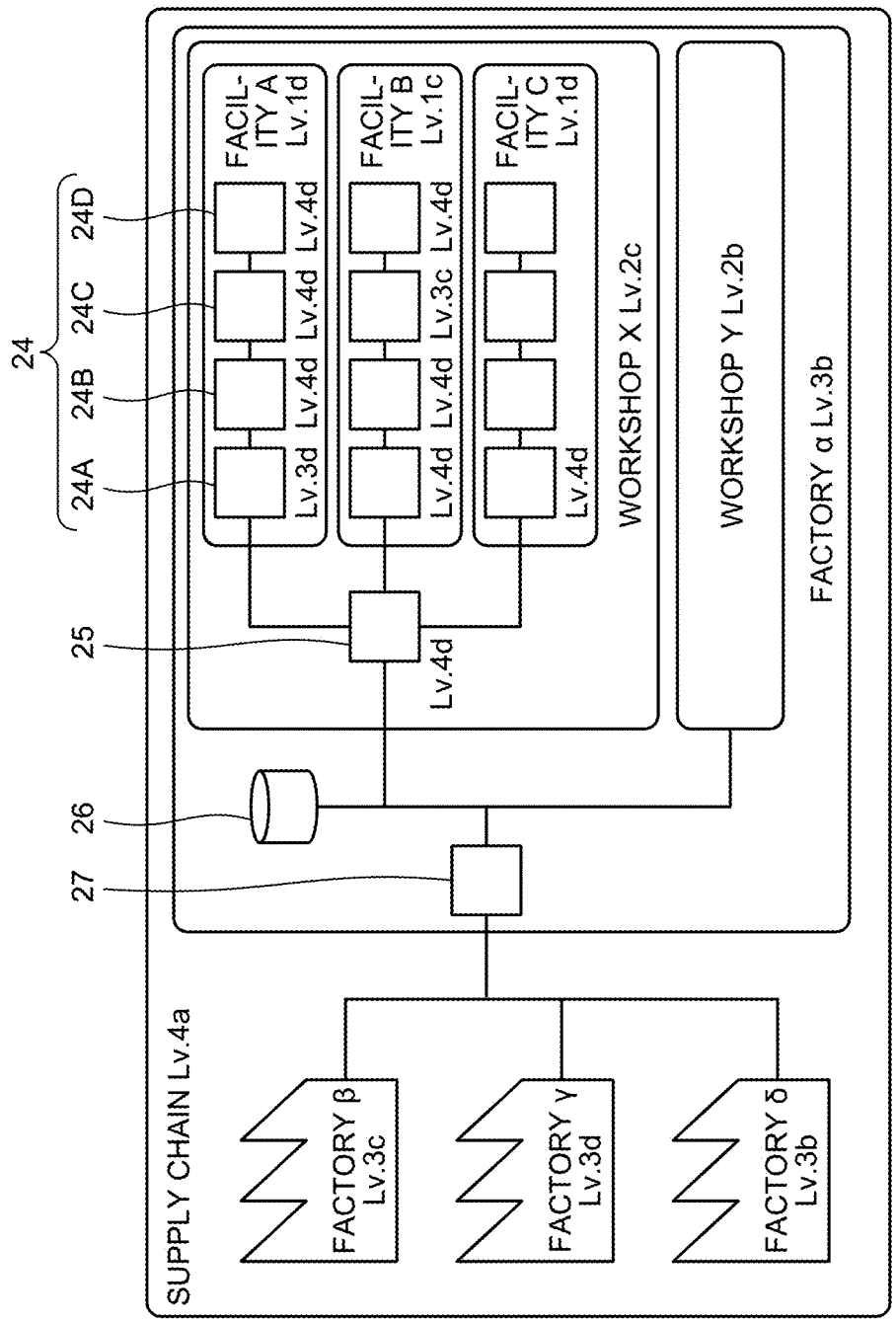
FIG. 4 is a first explanatory diagram illustrating presentation of a maturity level by a presentation unit included in the IT-utilization evaluation device according to the first embodiment.

FIG. 4 is a first explanatory diagram illustrating presentation of a maturity level by the presentation unit 14 included in the IT-utilization evaluation device 100 according to the first embodiment. FIG. 4 illustrates an example of the screen to be displayed on a display that is hardware having the function of the presentation unit 14. FIG. 4 illustrates four factories 21 including a "factory α", a "factory β", a "factory γ", and a "factory δ" within the box representing the supply chain 20. Within the box representing the "factory α", two workshops 22 including a "workshop X" and a "workshop Y" are illustrated. Within the box representing the "workshop X", three facilities 23 including a "facility A", a "facility B", and a "facility C" are illustrated. The lines connecting between the constituent elements indicate that it is possible to receive/transmit data between these constituent elements, that is, communication between these constituent elements is established.

In each facility 23, squares representing the devices 24 that are constituent elements of the facility 23, and a connection between the devices 24 are illustrated. FIG. 4 illustrates, within the box representing the "facility A", four devices 24 that are constituent elements of the "facility A", including devices 24A, 24B, 24C, and 24D. For example, the device 24A is a programmable logic controller that controls a controlled device within the "facility A". The device 24B is a display device that displays information on the operational state of the controlled device. The device 24C is an encoder that detects operation of the controlled device. The device 24D is a servo motor that is a drive unit of the controlled device. Within the box representing the "facility B", the devices 24 that are constituent elements of the "facility B" are illustrated. Within the box representing the "facility C", the devices 24 that are constituent elements of the "facility C" are illustrated. It is allowable that notation representing the type of the device 24 is given in the square indicating the device 24.

In the "workshop X", a device 25 is provided. The device 25 has installed therein a tool to aggregate data in process management. The device 25 is a computer or a controller. The device 25 is connected to a controller included in each facility 23 provided in the "workshop X", such as the device 24A that is a controller included in the "facility A". The device 25 aggregates data obtained by each facility 23 provided in the "workshop X". A device 25, which is similar to the device 25 provided in the "workshop X", is also provided in the "workshop Y" within the "factory α" as well as in each individual workshop 22 within each individual factory 21 other than the "factory α".

In the "factory α", a device 26 and a device 27 are provided. Data used for process management in the "factory α" is aggregated in the device 26. The device 27 receives/transmits data between the factories 21. Each of the devices 26 and 27 is a computer or a controller. The devices 26 and 27 are connected to the device 25 included in each workshop 22 within the "factory α". In each of the factories 21 other than the "factory α", devices 26 and 27 are also provided, which are similar to the devices 26 and 27 provided in the "factory α". The devices 26 included in the factories 21 are connected to each other through the network such that the devices 26 are capable of communicating with each other. The network is a communication network such as the Internet, a LAN (Local Area Network), or a VPN (Virtual Private Network).

On the basis of setting data, the presentation unit 14 displays each of the constituent elements included in the supply chain 20 and a connection state between the constituent elements. In the example illustrated in FIG. 4, in the "workshop X" which is one of the constituent elements included in the "factory α", the facilities 23 and the devices 24 within each of the facilities 23 are displayed. In the "workshop Y" within the "factory α", while the box representing the "workshop Y" is illustrated, the constituent elements included in the "workshop Y" are not displayed in the box.

The input unit 13 receives a manipulation to switch between displays on the presentation unit 14. In accordance with the manipulation of the input unit 13, the presentation unit 14 switches between a display of the constituent elements included in the "workshop X" and a display of the constituent elements included in the "workshop Y". It is allowable that the presentation unit 14 displays the constituent elements included in the "workshop X" simultaneously with the constituent elements included in the "workshop Y" without switching between the displays.

In the example illustrated in FIG. 4, the constituent elements included in the "factory α" are displayed. In FIG. 4, only graphics of the factories 21 including the "factory β", "factory γ", and "factory δ" are illustrated, while the constituent elements included in these factories 21 are not displayed. In accordance with a manipulation of the input unit 13, the presentation unit 14 switches a display of the constituent elements of the "factory α" to a display of the constituent elements of the factory 21 other than the "factory α". It is allowable that the presentation unit 14 simultaneously displays the constituent elements of all the factories 21 included in the supply chain 20 without switching between the displays.

Next, presentation of the levels determined by the automation determination unit 15 and the scale determination unit 16 are described. In FIG. 4, in a combination of numeric and alphabet, the numeric represents the scale level described above. The alphabet represents the maturity level described above. For example, "Lv.4a" indicates that the scale level is "level 4", and the maturity level of automation is "level a".

The automation determination unit 15 and the scale determination unit 16 identify the function of the device 24A on the basis of information on the product specifications of the device 24A in the setting data. The automation determination unit 15 determines the maturity level that can be accommodated by the device 24A on the basis of the function of the device 24A. The scale determination unit 16 determines the scale level of the range within which the device 24A is capable of receiving/transmitting data on the basis of the function of the device 24A. The phrase "being capable of receiving/transmitting data" indicates that the device 24A includes an interface to receive/transmit data, and is capable of receiving information from a communications partner.

In FIG. 4, "Lv.3d" displayed along with the square representing the device 24A indicates that the device 24A is capable of receiving/transmitting data on the scale up to "level 3" and is capable of accommodating automation equivalent to "level d". The automation determination unit 15 also determines the maturity level that can be accommodated by each individual device 24 other than the device 24A. The scale determination unit 16 also determines the scale level of the range within which each individual device 24 other than the device 24a is capable of receiving/transmitting data. The presentation unit 14 displays the levels for each individual device 24. The maturity level of automation that can be accommodated by the device 24, and the level of the scale on which the device 24 is capable of receiving/transmitting data are displayed. The levels displayed for the device 24 indicate the level of capability of the device 24 to accommodate automation and to receive/transmit data.

In FIG. 4, "Lv.1d" displayed along with the name "facility A" represents the scale level and the maturity level in the "facility A". By referencing the setting data stored in the setting-data storing unit 18, the scale determination unit 16 identifies the devices 24A, 24B, 24C, and 24D as the devices 24 included in the "facility A". The scale determination unit 16 understands from the setting data that in the "facility A", there is not an element responsible for a lower-hierarchical process than the process in the "facility A", and thus determines that the process in the "facility A" is a minimum unit process in the supply chain 20. That is, the scale determination unit 16 determines that the process in the "facility A" is the lowest-hierarchical process in the hierarchical structure described above. Due to this operation, the scale determination unit 16 determines that the scale level in the "facility A" is the lowest level, "level 1". The automation determination unit 15 determines the maturity level in the "facility A" on the basis of each maturity level of the devices 24A, 24B, 24C, and 24D that are constituent elements of the "facility A". In the example illustrated in FIG. 4, since the maturity levels of the devices 24A, 24B, 24C, and 24D are all "level d", the automation determination unit 15 determines that the maturity level in the "facility A" is "level d".

The automation determination unit 15 also determines the maturity level of automation in each individual facility 23 other than the "facility A" on the basis of the maturity levels of automation in the devices 24 that are constituent elements of the facility 23. The maturity levels in three of the four devices 24 in the "facility B" are "level d", while the maturity level in the one remaining device 24 is "level c". The automation determination unit 15 determines that the maturity level in the "facility B" is "level c" that is lowest of the maturity levels in the devices 24. On the screen, the "facility B" is given notation "Lv.1c" that represents the scale level and the maturity level in the "facility B".

On the basis of the setting data on the devices 24 included in the "facility A", "facility B", and "facility C", the scale determination unit 16 identifies the process in the "workshop X" as a set of the processes in the "facility A", "facility B", and "facility C". The scale determination unit 16 determines that the scale level in the "workshop X" is "level 2" that is one level higher than the level in the facility 23. The automation determination unit 15 determines the maturity level in the "workshop X" on the basis of the maturity levels in the "facility A", "facility B", and "facility C" that are constituent elements of the "workshop X". The maturity levels in the "facility A", "facility B", and "facility C" are "level d", "level c", and "level d", respectively. The automation determination unit 15 determines that the maturity level in the "workshop X" is "level c" that is lowest of the maturity levels in the facilities 23. On the screen, the "workshop X" is given notation "Lv.2c" that represents the scale level and the maturity level in the "workshop X".

On the basis of the setting data on the devices 24 included in the "workshop X" and "workshop Y", the scale determination unit 16 identifies the process in the "factory α" as a set of the processes in the "workshop X" and the "workshop Y". The scale determination unit 16 determines that the scale level in the "factory α" is "level 3" that is one level higher than the level in the workshop 22. The automation determination unit 15 determines the maturity level in the "factory α" on the basis of the maturity levels in the "workshop X" and "workshop Y" that are constituent elements of the "factory α". The maturity levels of the "workshop X" and "workshop Y" are "level c" and "level b", respectively. The automation determination unit 15 determines that the maturity level in the "factory α" is "level b" that is lowest of the maturity levels in the workshops 22. On the screen, the "factory α" is given notation "Lv.3b" that represents the scale level and the maturity level in the "factory α".

On the basis of the setting data on the devices 24 included in the "factory α", "factory β", "factory γ", and "factory δ", the scale determination unit 16 identifies the process in the supply chain 20 as a set of the processes in the "factory α", "factory β", "factory γ", and "factory δ". The scale determination unit 16 determines that the scale level of the supply chain 20 is "level 4" that is one level higher than the level of the factory 21. The scale determination unit 16 determines the scale level of the supply chain 20 to be "level 4". The automation determination unit 15 determines the maturity level in the "supply chain 20" on the basis of the maturity levels in the "factory α", "factory β", "factory γ", and "factory δ" that are constituent elements of the supply chain 20. The maturity levels in the "factory α", "factory β", "factory γ" and "factory δ" are "level b", "level c", "level d", and "level b" respectively. The lowest maturity level of the maturity levels of the factories 21 is "level b".

However, the devices 24 constituting the supply chain 20 include the device 24 that does not have a capability to accommodate the scale of "level 4". Each of the "facility A" and "facility B" includes one device 24 with its capability at only "level 3". When the automation determination unit 15 determines that while automation equivalent to "level b" is not achieved on the scale of "level 4" due to the presence of the one device 24 described above, automation equivalent to "level a" has been achieved, then the automation determination unit 15 determines that the maturity level in the supply chain 20 is "level a". On the screen, the "supply chain" is given notation "Lv.4a" that represents the scale level and the maturity level in the supply chain 20.

In the manner as described above, the presentation unit 14 presents the level that shows an evaluation of IT utilization in the supply chain 20, and presents the details on the evaluation, that is, the maturity level of automation in each individual factory 21, in each individual workshop 22, and in each individual facility 23 which constitute the supply chain 20. Through this presentation, a user can know the details on the evaluation of IT utilization in the managed process.

The presentation unit 14 can present the details on the evaluation of IT utilization in the managed process in an easily understandable manner by displaying determination results of the maturity level of automation along with a display of the connection state between the constituent elements included in the managed process.

Examples of the indicator to be employed as the KPI, and the determination of the maturity level of automation are described here. In a case where the facility utilization rate is measured, each factory 21 constituting the supply chain 20 is required to be capable of measuring the facility utilization rate of the factory 21. Furthermore, the factory 21 is required to be capable of measuring the facility utilization rate of each workshop 22. The workshop 22 is also required to be capable of measuring the facility utilization rate of each facility 23 and the operating rate of its workers.

At the time of installing the facility 23, the devices 24 constituting the facility 23 are connected to each other by connection work using the setting tool, such that the devices 24 are capable of receiving/transmitting various types of data. Each device 24 has a function of measuring the facility utilization rate therein to measure the facility utilization rate of the facility 23. Examples of the function of measuring the facility utilization rate include a timer to measure the operational time, a function of detecting an anomaly in the operation, and a communication function to aggregate the data on the operational time and the information on the anomaly detection. As described above, the automation determination unit 15 can determine the maturity level of automation in the facility 23 by checking the level of capability of the devices 24 on the basis of the product specifications of the devices 24, and by checking the function of each of the devices 24 constituting the facility 23 on the basis of the setting data.

In a case where the power consumption amount is measured, a power measurement device is provided in a system power supply that supplies power to the workshop 22, so that it is possible to measure the power consumption amount in the workshop 22. In this case, each facility 23 within the workshop 22 is not provided with a configuration to measure the power consumption amount. Since the workshop 22 has a configuration to obtain data on the power consumption amount, the process in the workshop 22 has achieved "level a". In contrast to that, since the facility 23 does not have a configuration to obtain data on the power consumption amount, the process in the facility 23 does not achieve "level a". For this reason, the maturity level with regard to the function of measuring the power consumption amount is higher in the workshop 22 than in the facility 23. As described above, compared to each of constituent elements, a set of the constituent elements can possibly achieve a higher maturity level depending on the indicator.

It is allowable to determine the maturity level of automation in a commercially-available device 24 among the devices 24 constituting the facility 23 on the basis of specifications data read from a database connected to the setting tool or from a database incorporated in the setting tool other than the setting data. The specifications data shows information on the product specifications.

In a case where the rate of non-defective products is measured, the devices 24 are needed which include a sensor for product inspection, an input/output interface to import data indicating results of the product inspection to a controller, the controller having analysis software installed therein to determine whether a product is defective by analysis of the data, and a network through which the data on the determination results is transmitted to be aggregated. Whether each of the devices 24 can serve a necessary function for measuring the rate of non-defective products is determined in advance by the specifications of each individual device 24. The automation determination unit 15 identifies each of the devices 24 connected to each other in the facility 23 on the basis of the setting data, and can determine the maturity level of automation of measuring the rate of non-defective products on the basis of information in the specifications data on each individual device 24 read from the database.

Figure 5:
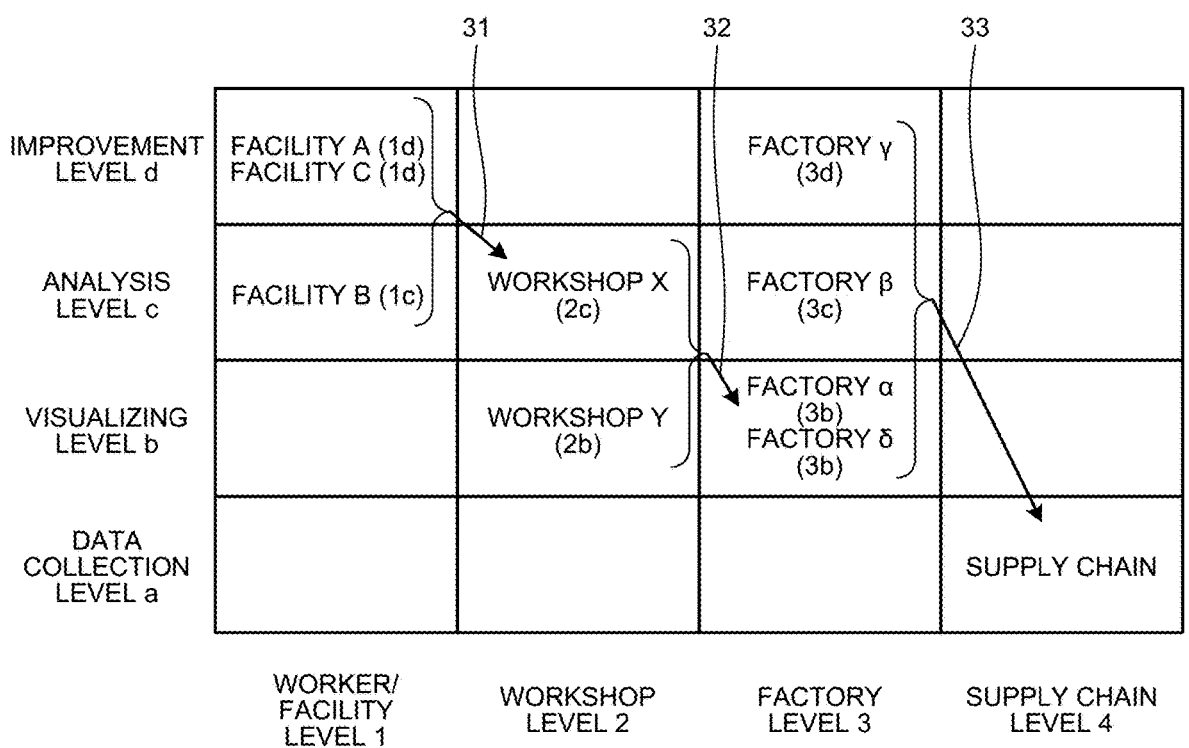
FIG. 5 is a second explanatory diagram illustrating presentation of a maturity level by the presentation unit included in the IT-utilization evaluation device according to the first embodiment.

FIG. 5 is a second explanatory diagram illustrating presentation of a maturity level by the presentation unit 14 included in the IT-utilization evaluation device 100 according to the first embodiment. FIG. 5 illustrates another example of the screen to be displayed on a display that is different from the screen illustrated in FIG. 4. The presentation unit 14 switches between the screen illustrated in FIG. 4 and the screen illustrated in FIG. 5 in accordance with a manipulation of the input unit 13.

On the screen illustrated in FIG. 5, a matrix is shown with the vertical axis representing the maturity level of automation and with the horizontal axis representing the scale level. The presentation unit 14 displays, within the matrix, determination results of the maturity level in a set of processes at each stage and in unit processes in the supply chain 20.

On the "level 1" column of the matrix, determination results of the maturity level of the process in the facility 23 and the process to be done by workers are displayed. In the example illustrated in FIG. 5, the determination results for the "facility A", "facility B", and "facility C" included in the "workshop X" are displayed. The names, "facility A" and "facility C", are entered in the "level d" box of the "level 1" column, so that the determination results for the "facility A" and "facility C" indicate "level d". The name "facility B" is entered in the "level c" box, so that the determination result for the "facility B" indicates "level c". Furthermore, the name "facility A" and the name "facility C" are given notation "1d" that represents the determination result. The name "facility B" is given notation "1c" that represents the determination result.

On the "level 2" column of the matrix, determination results of the maturity level for the workshops 22 are displayed. On the "level 3" column, determination results of the maturity level for the factories 21 are displayed. On the "level 4" column, a determination result of the maturity level for the supply chain 20 is displayed. On the "level 2" column, the "level 3" column, and the "level 4" column, determination results are displayed in the same manner as the "level 1" column.

In FIG. 5, an arrow 31 directed from the display of "facility A, "facility B", and "facility C" toward the display of "workshop X" indicates that the "facility A", "facility B", and "facility C" are included in the "workshop X". In this manner, the presentation unit 14 displays determination results of the maturity level along with the display of the inclusion relation between the workshop 22 and the facilities 23.

An arrow 32 directed from the display of "workshop X" and "workshop Y" toward the display of "factory α" indicates that the "workshop X" and "workshop Y" are included in the "factory α". In this manner, the presentation unit 14 displays determination results of the maturity level along with the display of the inclusion relation between the workshops 22 and the factory 21.

Furthermore, an arrow 33 directed from the display of "factory α", "factory β", "factory γ", and "factory δ" toward the display of "supply chain" indicates that the "factory α", "factory β", "factory γ", and "factory δ" are included in the supply chain 20. In this manner, the presentation unit 14 displays determination results of the maturity level along with the display of the inclusion relation between the factories 21 and the supply chain 20.

In the example illustrated in FIG. 5, the determination results for the "workshop X" and the workshop Y", which are constituent elements of the "factory α", among the workshops 22 in the supply chain 20 in its entirety are displayed. In accordance with a manipulation of the input unit 13, the presentation unit 14 switches a display of the constituent elements of the "factory α" to a display of the constituent elements of the factory 21 other than the "factory α".

In the example illustrated in FIG. 5, the determination results for the "facility A", "facility B", and "facility C", which are constituent elements of the "workshop X", among the facilities 23 within the "factory α" are displayed. In accordance with a manipulation of the input unit 13, the presentation unit 14 switches a display of the constituent elements included in the "workshop X" to a display of the constituent elements included in the "workshop Y".

In this manner, the presentation unit 14 displays the determination results along with the display of the inclusion relation between a managed process and unit processes that are constituent elements of the managed process. The maturity levels in each individual factory 21, in each individual workshop 22, and in each individual facility 23 which constitute the supply chain 20 are presented along with their inclusion relations, so that a user can know the details on an evaluation of IT utilization in the managed process.

It is understood from the current status illustrated by the determination results in FIGS. 4 and 5 that in order to raise the maturity level of automation in the "workshop X" from "level c" to "level d", it is necessary to raise the maturity level of automation in the "facility B" from "level c" to "level d". Furthermore, it is understood that in order to raise the maturity level of automation in the "facility B", the device 24, which is one of the devices 24 that are constituent elements of the "facility B", and which has been determined to have the scale level and maturity level of "3c", needs to raise the maturity level of automation from "level c" to "level d".

It is understood from the current status illustrated by the determination results in FIGS. 4 and 5 that in order to raise the maturity level of automation in the "supply chain 20" from "level a" to "level b", it is necessary for one of the devices 24 included in the "facility A" and for one of the devices 24 included in the "facility B" to increase their scale level from "level 3" to "level 4". In this manner, by referencing the display on the presentation unit 14, a user can easily identify the unit process regarded as a bottleneck in an evaluation of IT utilization. A constituent element with the lowest maturity level of automation among the constituent elements of a managed process is determined to be a bottleneck.

FIG. 6 is a third explanatory diagram illustrating presentation of a maturity level by the presentation unit 14 included in the IT-utilization evaluation device 100 according to the first embodiment. On the screen illustrated in FIG. 6, a display of a bottleneck is added to the screen illustrated in FIG. 4. FIG. 6 illustrates balloons 34 and 35 as an example of the display of the bottleneck.

The balloon 34 indicates that the device 24, which is one of the devices 24 within the "facility A" and which has the scale level and maturity level of "3d", is a bottleneck in the evaluation in the supply chain 20. The balloon 35 indicates that the device 24, which is one of the devices 24 within the "facility B" and which has the scale level and maturity level of "3c", is a bottleneck in the evaluation in the "factory α" and in the evaluation in the "workshop X". The presentation unit 14 can display the unit processes regarded as a bottleneck in a more easily understandable manner by adding the balloons 34 and 35.

The proposal processing unit 17 determines specifics of a proposal for promotion of IT utilization in view of the current status indicated by a determination result. The presentation unit 14 presents the specifics of the proposal determined by the proposal processing unit 17. Each of the balloons 34 and 35 is displayed with a button 36 to receive a manipulation for displaying the specifics of a proposal. When the button 36 within the balloon 34 is manipulated, the proposal processing unit 17 determines the specifics of a proposal that can serve as useful reference for improvements to the bottleneck shown by the balloon 34. When the button 36 within the balloon 35 is manipulated, the presentation unit 14 presents the specifics of a proposal that can serve as useful reference for improvements to the bottleneck shown by the balloon 35. A user references the specifics of the proposal presented by the presentation unit 14, and this makes it possible for the user to effectively promote IT utilization.

The maturity level of automation in the supply chain 20, the factory 21, the workshop 22, and the facility 23 can be increased by introducing the device 24 capable of achieving a higher maturity level of automation instead of the device 24 regarded as a bottleneck. Aside from that, the maturity level of automation in the supply chain 20, the factory 21, the workshop 22, and the facility 23 can possibly be increased by additionally introducing another device 24 that can be combined with the device 24 regarded as a bottleneck.

The proposal processing unit 17 checks the current status illustrated by the determination results against an instance of the promotion of IT utilization, and can determine the specifics of a proposal on the basis of remedial measures taken in an instance similar to the current status. It is allowable that the proposal processing unit 17 obtains information on the device 24 that is replaceable with the device 24 regarded as a bottleneck, and information on an additional device 24 that can be combined with the device 24 regarded as a bottleneck, and then determines the specifics of the proposal on the basis of the obtained information.

The information to be used for a proposal presented by the proposal processing unit 17 is stored in a database that is an information holding unit outside the IT-utilization evaluation device 100. In the database responsible for collecting instances of the promotion of IT utilization, information showing instances of the promotion of IT utilization is accumulated as needed. In the database that stores therein information on the devices 24, the information is updated as needed as the device 24 is sold and replaced by another. The IT-utilization evaluation device 100 references the information stored in the database, and is thus capable of presenting a proposal more appropriate to the current status.

The IT-utilization evaluation device 100 automatically obtains the setting data when a connection and communication between the constituent elements in the supply chain 20 is set. After having obtained the setting data, the IT-utilization evaluation device 100 automatically calculates the scale level and the maturity level. It is allowable that the IT-utilization evaluation device 100 calculates the scale level and the maturity level when an instruction to start the evaluation is provided, other than calculating the scale level and the maturity level at the time of setting the connection and communication. In this case, the IT-utilization evaluation device 100 receives a manipulation for starting the evaluation at the input unit 13.

Next, operation of the IT-utilization evaluation device 100 according to the first embodiment is described. FIG. 7 is a flowchart illustrating an operational procedure for the IT-utilization evaluation device 100 according to the first embodiment. When the IT-utilization evaluation device 100 starts an evaluation, the automation determination unit 15 and the scale determination unit 16 read setting data stored in the setting-data storing unit 18 at Step S1. At Step S2, the scale determination unit 16 determines the scale level in a managed process and the scale level in unit processes on the basis of the setting data read at Step S1. The scale determination unit 16 identifies an inclusion relation between the managed process and the unit processes on the basis of the determinations of the scale level in the managed process and the scale level in the unit processes.

At Step S3, the automation determination unit 15 determines the maturity level of automation in the managed process and the maturity level of automation in the unit processes. The automation determination unit 15 determines the maturity level of automation in the unit processes on the basis of the setting data read at Step S1. The automation determination unit 15 determines the maturity level of automation in the managed process on the basis of the maturity level of automation in the unit processes.

At Step S4, the presentation unit 14 presents determination results of the maturity level in the managed process and the unit processes obtained at Step S3. At Step S5, the proposal processing unit 17 determines whether a user has provided an instruction to present the specifics of a proposal for promotion of IT utilization in view of the current status. The proposal processing unit 17 determines that the instruction regarding the presentation has been provided when either of the buttons 36 described above is manipulated. The proposal processing unit 17 determines that the instruction regarding the presentation is not provided when either of the buttons 36 described above is not manipulated.

When the instruction regarding the presentation has been provided (YES at Step S5), the proposal processing unit 17 performs a process of determining the specifics of the proposal. At Step S6, the presentation unit 14 presents the specifics of the proposal determined by the proposal processing unit 17. After the presentation at Step S6, the IT-utilization evaluation device 100 ends the operation illustrated in FIG. 7. When the instruction regarding the presentation is not provided (NO at Step S5), the IT-utilization evaluation device 100 also ends the operation illustrated in FIG. 7.

Next, the hardware configuration of the IT-utilization evaluation device 100 is described. Each of the functional units included in the IT-utilization evaluation device 100 illustrated in FIG. 1 is implemented by using a computer or a controller executing the IT-utilization evaluation program according to the first embodiment.

FIG. 8 is a block diagram illustrating a hardware configuration of the IT-utilization evaluation device 100 according to the first embodiment. The IT-utilization evaluation device 100 includes a CPU (Central Processing Unit) 41 to perform various types of processing, a RAM (Random Access Memory) 42 including a data storage area, a ROM (Read Only Memory) 43 that is a nonvolatile memory, and an external storage device 44 to store therein the IT-utilization evaluation program and various types of information. The IT-utilization evaluation device 100 includes a communication interface (I/F) 45 that is an interface to connect with devices outside the IT-utilization evaluation device 100, an input device 46 to input information, and a display 47 that is an output device to display information on a screen. The individual units of the IT-utilization evaluation device 100 illustrated in FIG. 8 are connected to each other through a bus 48.

The CPU 41 executes programs stored in the ROM 43 and the external storage device 44. The functions of the automation determination unit 15, the scale determination unit 16, and the proposal processing unit 17 which are included in the control unit 10 illustrated in FIG. 1 are implemented by using the CPU 41. The external storage device 44 is an HDD (Hard Disk Drive) or an SSD (Solid State Drive). The function of the setting-data storing unit 18 included in the storage unit 11 illustrated in FIG. 1 is implemented by using the external storage device 44. The ROM 43 has stored therein a boot loader that is software or a program to control the hardware that is the IT-utilization evaluation device 100. The boot loader is a basic control program for the hardware such as a BIOS (Basic Input/Output System) or a UEFI (Unified Extensible Firmware Interface). It is allowable that the IT-utilization evaluation program is stored in the ROM 43.

Various types of programs stored in the ROM 43 and the external storage device 44 are loaded to the RAM 42. The CPU 41 develops the IT-utilization evaluation program in the RAM 42 to perform various types of processing. The input device 46 includes a keyboard and a pointing device. The function of the input unit 13 illustrated in FIG. 1 is implemented by using the input device 46. One of the examples of the display 47 is a liquid crystal display including a liquid crystal panel. The function of the presentation unit 14 illustrated in FIG. 1 is implemented by using the display 47. The function of the communication unit 12 illustrated in FIG. 1 is implemented by using the communication I/F 45.

It is allowable that the IT-utilization evaluation program is stored in a computer-readable storage medium. It is allowable that the IT-utilization evaluation device 100 stores the IT-utilization evaluation program, which has been stored in the storage medium, into the external storage device 44. The storage medium may be a transportable storage medium that is a flexible disk, or may be a flash memory that is a semiconductor memory. It is also allowable to install the IT-utilization evaluation program from another computer or a sever device to the hardware through a communication network.

It is allowable that the IT-utilization evaluation program is integrated into the setting tool described above. In this case, the hardware having the setting tool installed therein serves the functions of the IT-utilization evaluation device 100. When a connection and communication between the constituent elements is set, this hardware automatically calculates the scale level and the maturity level of automation on the basis of the setting data.

Figure 9:
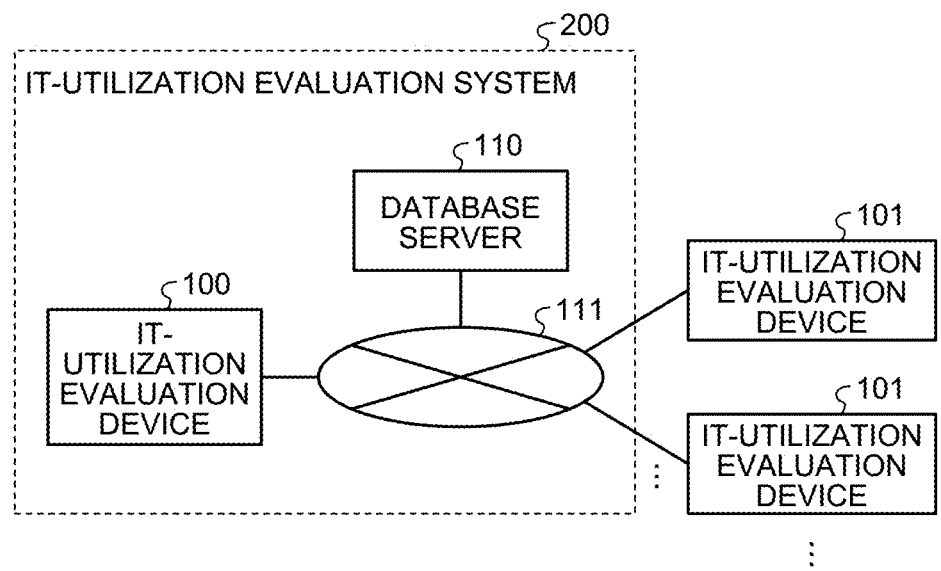
FIG. 9 is a diagram illustrating an IT-utilization evaluation system including the IT-utilization evaluation device according to the first embodiment.

Next, descriptions are given of an IT-utilization evaluation system including the IT-utilization evaluation device 100 according to the first embodiment. FIG. 9 is a diagram illustrating an IT-utilization evaluation system 200 including the IT-utilization evaluation device 100 according to the first embodiment. The IT-utilization evaluation system 200 includes the IT-utilization evaluation device 100 and a database server 110 that is the information holding unit. The database server 110 is connected to the IT-utilization evaluation device 100 through a network 111. The database server 110 has a function of the database to hold therein information about promotion of IT utilization. The network 111 is the Internet that is a wide area network. The database server 110 is managed by a service provider who provides services for managing the IT-utilization evaluation system 200. It is allowable that the database server 110 is managed by a user.

A plurality of IT-utilization evaluation devices 101, each of which is a device outside the IT-utilization evaluation system 200, evaluate IT utilization similarly to the IT-utilization evaluation device 100. The IT-utilization evaluation devices 101 are connected to the database server 110 through the network 111 similarly to the IT-utilization evaluation device 100. The IT-utilization evaluation device 100 and the IT-utilization evaluation devices 101 individually provide information indicating the actual accomplishment of promotion of IT utilization to the database server 110. The database server 110 accumulates therein information provided individually from the IT-utilization evaluation device 100 and the IT-utilization evaluation devices 101.

The proposal processing unit 17 in the IT-utilization evaluation device 100 references the information stored in the database server 110 to determine the specifics of a proposal. The IT-utilization evaluation device 100 can refer to the information accumulated in the database server 110 to present a proposal. Each of the IT-utilization evaluation devices 101 can reference the information stored in the database server 110 similarly to the IT-utilization evaluation device 100.

It is allowable that information, other than the information provided from the IT-utilization evaluation devices 100 and 101, is accumulated in the database server 110. It is allowable that information, provided by a service provider or the like who manages the database server 110, is accumulated in the database server 110. It is allowable that information obtained by a simulation is accumulated in the database server 110 other than the information indicating the actual accomplishment.

It is allowable that the database server 110, having stored therein specifications data on the device 24 installed in the facility 23, is connected to the network 111. The database server 110 in which the specifications data is accumulated is managed by a manufacturer of the device 24 or a dealer of the device 24. It is allowable that the database server 110 is managed by a user. Specifications data provided from the manufacturer or the dealer is stored in the database server 110 managed by the user. The IT-utilization evaluation device 100 can refer to the information accumulated in the database server 110 to present a proposal for replacement of the device 24 or for introduction of an additional device 24.

Figure 10:
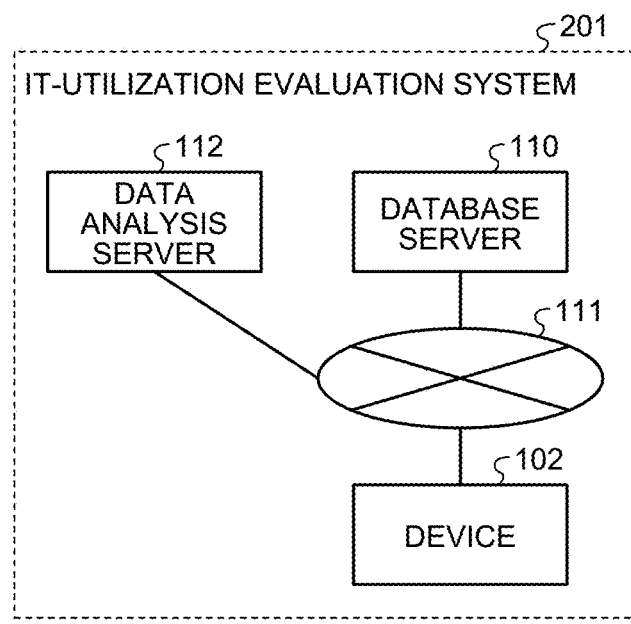
FIG. 10 is a diagram illustrating an IT-utilization evaluation system according to a modification of the first embodiment.

FIG. 10 is a diagram illustrating an IT-utilization evaluation system 201 according to a modification of the first embodiment. In the IT-utilization evaluation system 201, the functional units identical to those in the IT-utilization evaluation device 100 illustrated in FIG. 1 are separated into a device 102 installed in the factory 21 and into a data analysis server 112. The device 102 is a computer or a controller having the same functions as the storage unit 11, the communication unit 12, the input unit 13, and the presentation unit 14 described above. The device 102 has the functions of the IT-utilization evaluation program, except the data analysis function. The device 102 has a hardware configuration identical to the hardware configuration of the IT-utilization evaluation device 100 illustrated in FIG. 8. It is allowable that the device 102 is a mobile terminal that is used by a user. The device 102 is an information processing terminal having the communication function, such as a smartphone or a tablet terminal.

The data analysis server 112 is a computer or a controller having the same function as the control unit 10 described above. The data analysis server 112 has a hardware configuration identical to the hardware configuration of the IT-utilization evaluation device 100 illustrated in FIG. 8. The data analysis server 112 has the data analysis function of the IT-utilization evaluation program. The data analysis server 112 is managed by a service provider who provides services for managing the IT-utilization evaluation system 201, or by a service provider who provides services for data analysis.

In the IT-utilization evaluation system 201, the functional units identical to those in the IT-utilization evaluation device 100 illustrated in FIG. 1 are separated into the device 102 and the data analysis server 112. It is allowable in the IT-utilization evaluation system 201 that the functional units that are identical to those in the IT-utilization evaluation device 100 are separated into multiple devices in a different manner from the present modification. The IT-utilization evaluation system 201 can be configured to separate the functional units that are identical to those in the IT-utilization evaluation device 100 into multiple devices in any manner.

According to the first embodiment, in the IT-utilization evaluation device 100 and the IT-utilization evaluation systems 200 and 201, the automation determination unit 15 determines the maturity level of automation in a managed process and unit processes that are included in the managed process. The IT-utilization evaluation device 100 and the IT-utilization evaluation systems 200 and 201 can obtain the details on the evaluation in the managed process on the basis of the evaluation in the unit processes. Due to this operation, the IT-utilization evaluation device 100 and the IT-utilization evaluation systems 200 and 201 can achieve an effect of obtaining the details on an evaluation of IT utilization in the managed process.

It is allowable that the IT-utilization evaluation device 100 and the IT-utilization evaluation systems 200 and 201 are used to evaluate IT utilization in a managed process other than the supply chain 20. A managed process that is a target to be evaluated may also be a chain of processes in a different type of industry other than the manufacturing industry.

The configurations described in the above embodiment are only examples of the content of the present invention. The configurations can be combined with other well-known techniques, and part of each of the configurations can be omitted or modified without departing from the scope of the present invention.

REFERENCE SIGNS LIST 10 control unit, 11 storage unit, 12 communication unit, 13 input unit, 14 presentation unit, 15 automation determination unit, 16 scale determination unit, 17 proposal processing unit, 20 supply chain, 21 factory, 22 workshop, 23 facility, 24, 24A, 24B, 24C, 24D, 25, 26, 27, 102 device, 31, 32, 33 arrow, 34, 35 balloon, button, 41 CPU, 42 RAM, 43 ROM, 44 external storage device, 45 communication I/F, 46 input device, 47 display, 48 bus, 100, 101 IT-utilization evaluation device, 110 database server, 111 network, 112 data analysis server, 200, 201 IT-utilization evaluation system.

The invention claimed is:

1. A system comprising:
a factory including operational devices that are hardware elements each responsible for an assigned function in the factory;
a sensor that obtains sensor data and that is coupled to at least one of the operational devices;
an information-technology-utilization evaluation device;
presentation circuitry; and
proposal processing circuitry, wherein
the information-technology utilization evaluation device is configured to evaluate a degree of utilization of information technology in process management targeted at a managed process that is a set of unit processes performed by the operational devices in the factory, the information-technology utilization evaluation device including
first determination circuitry to evaluate an achievement status of automation of the process management through utilization of the information technology to determine a maturity level of the automation in the managed process and a maturity level of the automation in the unit processes,
wherein the first determination circuitry determines the maturity level in the managed process on a basis of the maturity level in the unit processes that are constituent elements of the managed process and based on an indicator value calculated from the sensor data,
the presentation circuitry is configured to present a determination result of the maturity level in the managed process and a determination result of the maturity level in the unit processes performed by the factory; and
the proposal processing circuitry is configured to determine specifics of a proposal for promotion of utilization of information technology in view of a current status indicated by the determination result of the maturity level in the managed process and the determination result of the maturity level in the unit processes performed by the operational devices in the factory,
the presentation circuitry is configured to display the determination result including an operational device graphical display indicating each operational device performing one or more of the unit processes in the factory and a graphical indication of a bottleneck in the unit processes performed by the operational devices,
the operational device graphical display showing connecting lines between operational devices capable of communicating with each other, the operational device graphical display showing a numeric representation of the determination result of the maturity level in the unit processes performed by each corresponding operational device in the factory, and
the graphical indication of the bottleneck is displayed as a balloon including a pointer, a text description, and a button,
the balloon being arranged outside a region of the operational device graphical display showing the operational devices, the pointer pointing to an operational device causing the bottleneck within the region of the operational device graphical display showing the operational devices, the text description identifying the bottleneck, and when the button is manipulated, the presentation circuitry displays the determined specifics of the proposal for promotion of utilization of information technology in the factory.

2. The system according to claim 1, wherein the maturity level represents a stage of the automation which has been achieved among stages of the process management ranging from identifying a work status in the managed process to improving productivity in the managed process.

3. The system according to claim 1, further comprising second determination circuitry to determine a scale level indicating a scale of the set, wherein a scale of the set represents a hierarchy of a hierarchical structure formed by an inclusion relation between the managed process and the unit processes.

4. The system according to claim 1, wherein the first determination circuitry determines the maturity level in the unit processes on a basis of settings of a connection of devices constituting a facility responsible for the unit processes.

5. The system according to claim 1, wherein the presentation circuitry displays the determination results along with a display of a connection state between the unit processes included in the managed process.

6. The system according to claim 1, wherein the presentation circuitry displays the determination results along with a display of an inclusion relation between the managed process and the unit processes.

7. The system according to claim 1, further comprising:
a database server to hold therein information about promotion of utilization of information technology.

8. An information-technology-utilization evaluation method to be implemented by an information-technology-utilization evaluation system, including a factory having operational devices that are hardware elements each responsible for an assigned function in the factory, a sensor that obtains sensor data and that is coupled to at least one of the operational devices, an information-technology-utilization evaluation device, presentation circuitry, and proposal processing circuitry, to evaluate a degree of utilization of information technology in process management targeted at a managed process that is a set of unit processes performed by the operational devices in the factory, the method comprising:
evaluating an achievement status of automation of the process management through utilization of the information technology to determine a maturity level of the automation in the managed process and a maturity level of the automation in the unit processes, wherein
the maturity level in the managed process is determined on a basis of the maturity level in the unit processes that are constituent elements of the managed process and based on an indicator value calculated from the sensor data;
presenting a determination result of the maturity level in the managed process and a determination result of the maturity level in the unit processes performed by the factory;
determining specifics of a proposal for promotion of utilization of information technology in view of a current status indicated by the determination result of the maturity level in the managed process and the determination result of the maturity level in the unit processes performed by the operational devices in the factory;

presenting the determined specifics of the proposal for promotion of utilization of information technology in the factory;

displaying the determination result including an operational device graphical display indicating each operational device performing one or more of the unit processes in the factory and a graphical indication of a bottleneck in the unit processes performed by the operational devices, the operational device graphical display showing connecting lines between operational devices capable of communicating with each other, the operational device graphical display showing a numeric representation of the determination result of the maturity level in the unit processes performed by each corresponding operational device in the factory;

displaying the graphical indication of the bottleneck as a balloon including a pointer, a text description, and a button;

displaying the balloon being outside a region of the operational device graphical display showing the operational devices, the pointer pointing to an operational device causing the bottleneck within the region of the operational device graphical display showing the operational devices, the text description identifying the bottleneck, and displaying the determined specifics of the proposal for promotion of utilization of information technology in the factory in response to manipulation of the button.

9. The system according to claim 1, wherein the proposal processing circuitry is configured to determine the specifics of the proposal for promotion of utilization of information technology on the basis of a remedial measure taken in an instance similar to the current status.

10. The system according to claim 1, wherein the proposal processing circuitry is configured to determine the specifics of the proposal for promotion of utilization of information technology on the basis of information on a device that is regarded as a bottleneck and information on an additional device that can be combined with the device that is regarded as the bottleneck.

* * * * *